United States Patent [19]
Biebl et al.

[11] Patent Number: 5,431,051
[45] Date of Patent: Jul. 11, 1995

[54] TUNNEL EFFECT ACCELERATION SENSOR

[75] Inventors: Markus Biebl; Thomas Scheiter; Helmut Klose, all of Munich, Germany

[73] Assignee: Siemens Aktiengesellschaft, Munich, Germany

[21] Appl. No.: 219,538

[22] Filed: Mar. 29, 1994

[30] Foreign Application Priority Data

Apr. 5, 1993 [DE] Germany ............... 43 11 123

[51] Int. Cl.6 .................................... G01P 15/13
[52] U.S. Cl. ...................... 73/517 B; 73/517 R
[58] Field of Search ............ 73/517 R, 517 B, 862.61, 73/862.639, 862.625

[56] References Cited

U.S. PATENT DOCUMENTS

| | | | |
|---|---|---|---|
| 4,638,669 | 1/1987 | Chou | 73/517 R |
| 4,891,984 | 1/1990 | Fuji | 73/517 R |
| 5,265,470 | 11/1993 | Kaiser | 73/862.625 |

FOREIGN PATENT DOCUMENTS 3834531  4/1990  Germany .

OTHER PUBLICATIONS

"Self-Controlled Micromechanical Scanning Tunneling Microscopy Sensor", IBM Technical Disclosure Bulletin, vol. 32, No. 12, May 1990, pp. 49–51.
"Micromachined Silicon Tunnel Sensor for Motion Detection," Kenny et al., Appl. Phys. Lett. 58(1), Jan. 7, 1991, pp. 100–102.
"Electron Tunnel Sensors," Kenny et al., J. Vac. Sci. Technol. A 10(4), Jul./Aug., 1992, pp. 2114–2118.

Primary Examiner—Thomas P. Noland
Assistant Examiner—Christine K. Oda
Attorney, Agent, or Firm—Hill, Steadman & Simpson

[57] ABSTRACT

An acceleration sensor is produced on a silicon substrate by etching to leave a cantilevered beam of polysilicon with a tip on the substrate projecting toward this beam. Acceleration of the sensor causes the beam to bend, thereby changing the spacing between the tip and the beam, and thereby also changing the tunnel current, which is measured. Electrodes are provided that, given application of a potential thereto, effect an electrostatic compensation of the bending of the beam.

3 Claims, 2 Drawing Sheets

TUNNEL EFFECT ACCELERATION SENSOR

BACKGROUND OF THE INVENTION

1. Field of the Invention

The present invention is directed to an acceleration sensor operating according to the principle of the electron tunnel effect in polysilicon and to a method for manufacturing such an acceleration sensor.

2. Description of the Prior Art

Tunnel effect acceleration sensors are disclosed in the articles by T. W. Kenny et al. in Appl. Phys. Lett. 58, pp. 100–102 (1991) and in J. Vac. Sci. Technol. A10 (4), pp. 2114–2118 (1992) wherein a cantilevered tip electrode is resiliently mounted above a counter-electrode on a silicon substrate by means of a strip (beam) or rectangle attached at an end or edge to the substrate. The strip or rectangle is produced by under-etching. An excursion of the resilient, cantilevered part as a consequence of inertial forces arising to acceleration can be identified with these sensors. In some of the embodiments, electrodes are provided at the movable parts and at the substrate, for compensating an excursion of the movable part. These sensors are manufactured by under-etchings at the surface of a compact silicon block.

SUMMARY OF THE INVENTION

An object of the present invention is to specify a more simply manufacturable tunnel effect acceleration sensor and a appertaining manufacturing method for such an acceleration sensor.

The above object is achieved in accordance with the principles of the present invention in an acceleration sensor, and a method for manufacturing same, wherein an electrically conductively doped beam of polysilicon is cantilevered on a silicon substrate, the substrate having a doped tip of polysilicon projecting toward and disposed beneath the free end of the beam, the tip being so close to the free end of the beam that electron tunneling occurs between the tip and the beam, and wherein electrodes are provided for electrostatically compensating inertial forces acting on the beam due to acceleration.

The sensor of the invention is composed of a cantilevered beam of polysilicon disposed above a silicon substrate. The tip required for the tunnel effect is fashioned at the surface of the substrate and is directed toward the polysilicon beam. Electrodes are present in order to electrostatically compensate excursions of the beam by applying suitable potentials.

DESCRIPTION OF THE PREFERRED EMBODIMENTS

Figure 1:
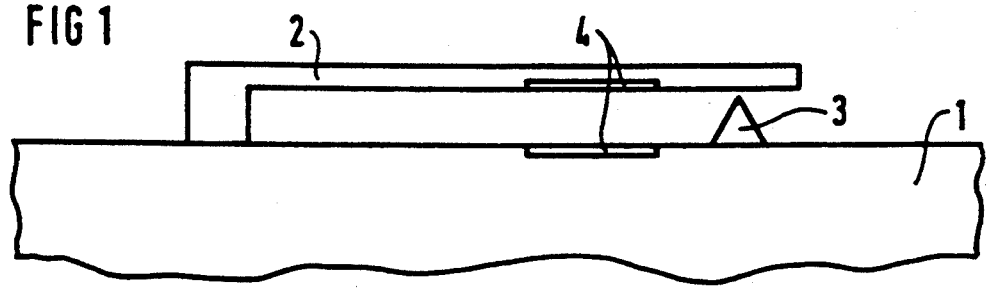
FIGS. 1 and 2 respectively show cross section through two exemplary embodiments of the sensor of the invention.

In the sensor of FIG. 1, an electrically conductively doped beam 2 of polysilicon is secured at one end on a silicon substrate 1. The beam is flexibly anchored (cantilevered) in this way. When the silicon substrate 1 is accelerated perpendicularly to the surfaces of the beam 2 parallel to the substrate 1, the beam 2 bends as a consequence of its inertia. This bending is dependent on the magnitude of the acceleration and is measured by utilization of the tunnel effect. To this end, a tip 3 of silicon, for example polysilicon, directed toward the beam 2 is located on the substrate 1 beneath the beam 2. Electrodes 4 produced by doping serve the purpose of electrostatically compensating the bending of the beam 2 by applying suitable potentials. The electrical voltage required for this purpose is a direct measure of the occurring acceleration. The tunnel current between the beam 2 and the tip 3 is thereby always held at a constant value. Since even the most minute bending of the beam 2 results in a large modification of the tunnel current, this technique is suitable for measuring accelerations with a sub-microgravity precision ($10^{-6}$ of the acceleration due to gravity. As a result of the compensation of the inertia of the beam 2, as set forth above, accelerations up to one hundred times the acceleration due to gravity can be measured. An extremely large range of measurement is realized in this way.

Figure 2:
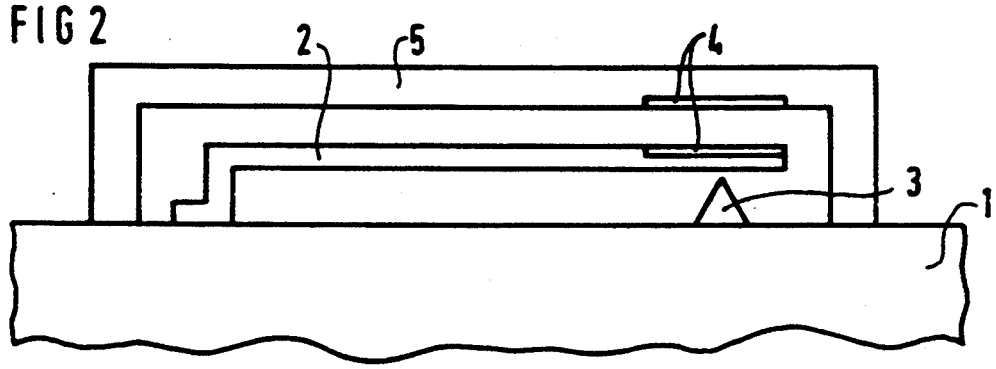
Figure 3:
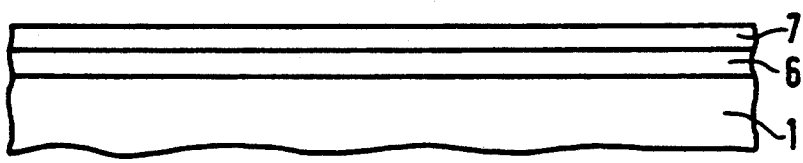
FIGS. 3 through 8 respectively show the sensor of the exemplary embodiment of FIG. 2 in cross section after various stages in the manufacturing method of the invention.
Figure 4:
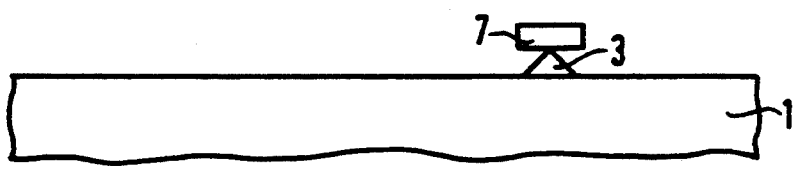

In the embodiment of FIG. 2, the beam 2 is situated in a cavity formed by a polysilicon layer 5. The electrodes 4 are located in this polysilicon layer 5 at that side of the beam 2 facing away from the silicon substrate 1. The cavity under the polysilicon layer 5 can be evacuated. The electrodes of the exemplary embodiments can each be additionally provided with metallizations.

Figure 5:
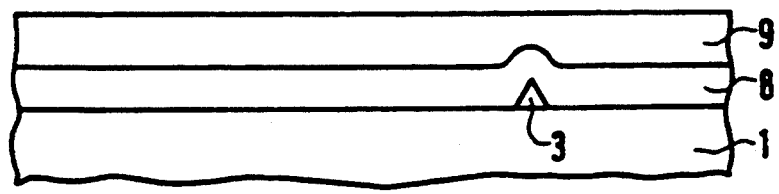
Figure 6:
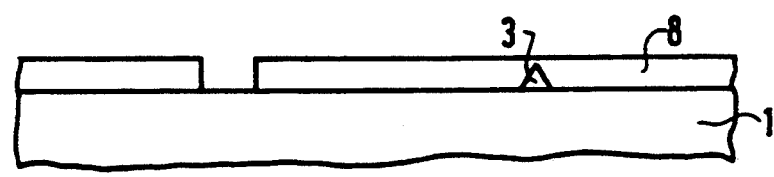

A manufacturing method for the embodiment shown in FIG. 2 shall now be set forth with reference to FIGS. 3 through 8. A first layer 6 of polysilicon and a second layer 7 of a different material are applied above one another on a silicon substrate 1. Polysilicon must be selectively etchable with respect to this different material. For example, an oxide or nitride (for example, $SiO_2$ or $Si_3N_4$) may be used as the material of the second layer 7. These layers are structured so that only a covered cubold of polysilicon remains at the location of the tip to be manufactured. The first layer 6 is removed by selective wet-chemical under-etching of the second layer 7 except for a tip 3 (see FIG. 4). The remaining part of the second layer 7 is removed. The tip 3 of polysilicon may be provided with a metallization of, for example, tungsten. After this, an auxiliary layer 8 (for example, $SiO_2$) is deposited surface-wide and a planarizing layer 9 is deposited thereon, so that the layer structure of FIG. 5 results. For example, BPSG (borophosphorous silicate glass) may be used as the planarizing layer. After the surface-wide application, the BPSG is caused to flow by heating. The planar surface occurs as a result. The layer sequence of FIG. 5 is then uniformly etched back, with the layer thickness being determined during etching by means of, for example, laser interferometry. As shown in FIG. 6, this results in the auxiliary layer 8 being uncovered by the etching and being etched back to such an extent that the tip 3 just remains covered. The slight spacing of the tip 3 from the beam 2 of polysilicon to be manufactured is defined in this way. This beam is subsequently produced by a surface-wide application of a layer of polysilicon, which is then removed except for the beam 2, after doping for the formation of an electrode 4 (see FIG. 7). The auxiliary layer 8 can now be removed, so that the exemplar,/embodiment of FIG. 2 is obtained.

Figure 7:
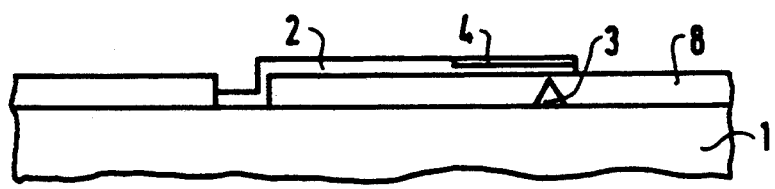
Figure 8:
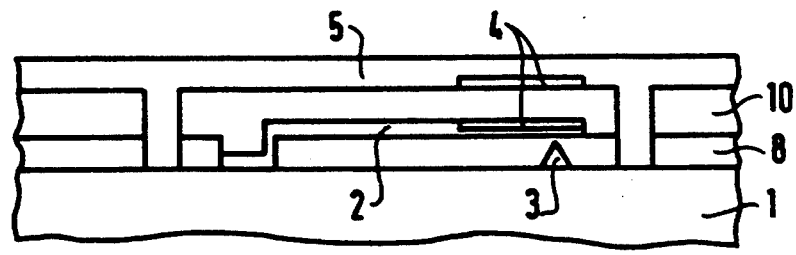

Another possibility is to apply another auxiliary layer 10 (see FIG. 8) surface-wide onto the structure of FIG. 7. The auxiliary layers 8 and 10 are structured and a polysilicon layer 5 is then applied, initially surface-wide, and is then removed except for the remaining portion according to the exemplary embodiment of FIG. 2. The auxiliary layer 8 and the further auxiliary layer 10 under the polysilicon layer 5 are removed, for example, through etching channels, after which the polysilicon layer 5 is evacuated and can be sealed by closing the etching channels. In a advantageous embodiment an electrode 4 is produced, above the electrode 4 fashioned in the beam 2, by doping before the re-etching of the polysilicon layer 5.

The manufacture of the sensor of the invention ensues in micromechanical process steps that are compatible with the technology for manufacturing integrated circuits. This has the advantage that control and evaluation electronics, as an electronic circuit, can be integrated in the silicon substrate 1 together with the sensor, and thus the precision and the signal-to-noise ratio of the sensor can be significantly improved.

Advantages of the sensor of the invention are high precision, extremely large range of measurement, extraordinarily low sensitivity to transverse accelerations, low noise susceptibility because of the integrated evaluation circuit, small dimensions, low weight and good integratability with further electrical or mechanical components.

Although modifications and changes may be suggested by those skilled in the art, it is the intention of the inventors to embody within the patent warranted hereon all changes and modifications as reasonably and properly come within the scope of their contribution to the art.

We claim as our invention:

1. An acceleration sensor comprising:
   a silicon substrate;
   a polysilicon layer disposed on said silicon substrate and forming a cavity;
   an electrically conductively doped beam of polysilicon contained in said cavity and having a fixed end anchored to said silicon substrate and a free end cantilevered above said substrate;
   an electrically conductively doped tip of polysilicon on said substrate projecting toward said free end of said beam and spaced a distance from said free end of said beam for permitting electron tunneling between said beam and said tip; and means for electrostatically compensating inertial forces acting on said beam when said substrate and said beam are accelerated comprising a first compensation electrode disposed on said polysilicon layer and a second compensation electrode, disposed opposite said first compensation electrode, on said beam.

2. An acceleration sensor as claimed in claim 1 wherein said cavity comprises an evacuated cavity.

3. An acceleration sensor comprising:
   a silicon substrate;
   an electrically conductively doped beam of polysilicon having a fixed end anchored to said silicon substrate and a free end cantilevered above said substrate;
   an electrically conductively doped tip of polysilicon on said substrate projecting toward said free end of said beam and spaced a distance from said free end of said beam for permitting electron tunneling between said beam and said tip; and
   means for electrostatically compensating inertial forces acting on said beam when said substrate and said beam are accelerated comprising a first compensation electrode disposed on said silicon substrate and a second compensation electrode, disposed opposite said first compensation electrode, on said beam.

* * * * *